United States Patent
Tsai et al.

(10) Patent No.: US 7,566,161 B2
(45) Date of Patent: Jul. 28, 2009

(54) REFLECTION PLATE

(75) Inventors: Yee-Hua Tsai, Taichung (TW);
Chun-Min Ko, Hemei Township, Changhua County (TW)

(73) Assignee: Au Optronics Corporation, Hsinchu (TW)

( * ) Notice: Subject to any disclaimer, the term of this patent is extended or adjusted under 35 U.S.C. 154(b) by 27 days.

(21) Appl. No.: 11/433,428

(22) Filed: May 15, 2006

(65) Prior Publication Data
US 2007/0195553 A1     Aug. 23, 2007

(30) Foreign Application Priority Data
Feb. 17, 2006    (TW) ............................. 95105479 A (51) Int. Cl.
*G02F 1/335* (2006.01)
(52) U.S. Cl. ........................................ 362/623
(58) Field of Classification Search .......... 315/241 P; 362/600–634; 349/65
See application file for complete search history.

(56) References Cited

U.S. PATENT DOCUMENTS

| | | | |
|---|---|---|---|
| 6,583,543 B1 * | 6/2003 | Itaya et al. | 313/318.11 |
| 6,924,605 B2 * | 8/2005 | Chun | 315/241 P |
| 7,270,462 B2 * | 9/2007 | Yu et al. | 362/609 |
| 7,339,637 B2 * | 3/2008 | Chen et al. | 349/65 |
| 2004/0130885 A1 | 7/2004 | Nakano | |

FOREIGN PATENT DOCUMENTS

| | | |
|---|---|---|
| CN | 1538216 | 10/2004 |
| JP | 2004-009591 | 1/2004 |
| JP | 2006-010789 | 1/2006 |

* cited by examiner

*Primary Examiner*—Anabel M Ton
(74) *Attorney, Agent, or Firm*—Rosenberg, Klein & Lee (57) ABSTRACT

A reflector in a backlight module comprises a reflection layer and an electrical conduction layer. The conducting is installed on one side of a reflection layer, and is connected to the ground of the system. Thereby, when the reflector is applied to an edge-type or a direct-type backlight module, by grounding the electrical conduction layer, normal operations of devices in the backlight module will not be affected by electromagnetic interference (EMI) or electrostatic discharge (ESD).

10 Claims, 7 Drawing Sheets

REFLECTION PLATE

FIELD OF THE INVENTION

The present invention relates generally to a reflector, and particularly to a reflectors of a backlight module.

BACKGROUND OF THE INVENTION

Backlight modules have been applied extensively to everyday lives. In particular, they can almost be found in digital devices such as regular cellular phones, personal digital assistants (PDAs), as well as in MP3 (MPEG Audio Layer3) players. The backlight modules of such digital devices are usually affected by electromagnetic interference (EMI), resulting in frame jitters. EMI is the interference of electromagnetic noises or unnecessary signals for devices and are generated by the operation of apparatus or devices containing electronic components. By means of radiation or conduction, other devices will be affected, and consequently abnormal operations will result.

Furthermore, the backlight modules will be damaged caused by electrostatic discharge (ESD). In everyday lives, it is normal to generate static charges by rubbing. After rubbing two insulating surfaces against each other and separating them, ESD will occur. ESD will damage integrated circuits (ICs) of the backlight modules, and will cause light-emitting diodes (LEDs) or cold cathode fluorescent lamps (CCFLs) of the backlight modules malfunction. Thereby, it is necessary to use many conducting materials, such as iron housings, sheets of copper or aluminum foil, or sheets of conducting polymer. By connecting the conducting materials with the ground of the device, the backlight modules can be free from EMI and ESD.

Figure 1A:
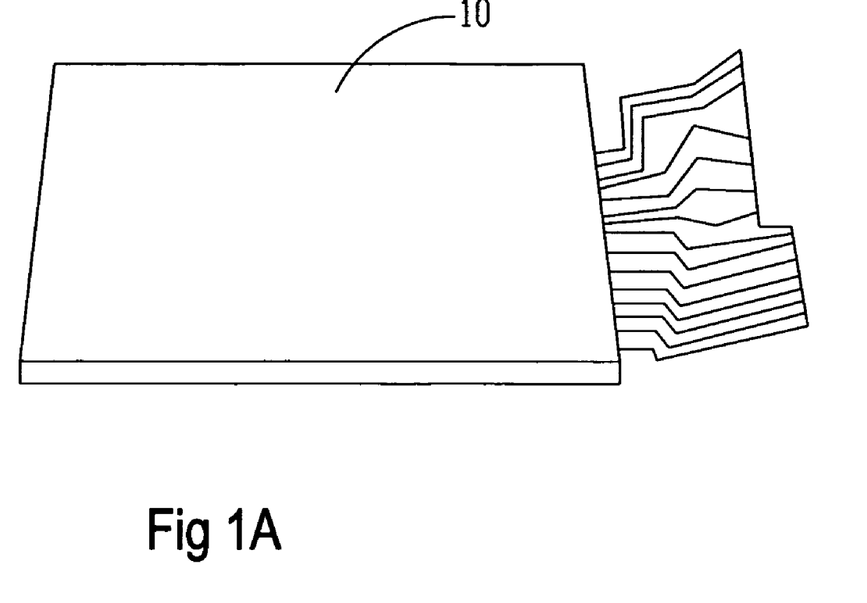
FIG. 1A is a three-dimensional view of a backlight module according to the prior art.

FIG. 1A is a three-dimensional view of a backlight module according to the prior art. As shown in the figure, the backlight module in the prior art uses a metal housing 10 to cover the backlight module, and connects the metal housing 10 to the ground of the system (ex. Cell-phone/PDA, etc.). Thereby, by means of the installed metal housing 10, the backlight module can avoid EMI and thus can operate normally. In addition, static charges can be led to the ground of the system. As a result, The ICs, LEDs, or CCFLs devices of the backlight module can be protected from the damages due to ESD. Moreover, the metal housing 10 not only can avoid EMI or ESD, it also can be a reflector or a reflecting cover of the backlight module at the same time. Nevertheless, installing the metal housing 10 will increase the thickness of the assembled backlight module. For modern digital devices such as cellular phones or PDAs, the volume of the devices tends to be compact. Consequently, there is no spare space to accommodate the metal housing 10. Besides, the manufacturing cost will be increased by installing the metal housing 10.

Figure 1B:
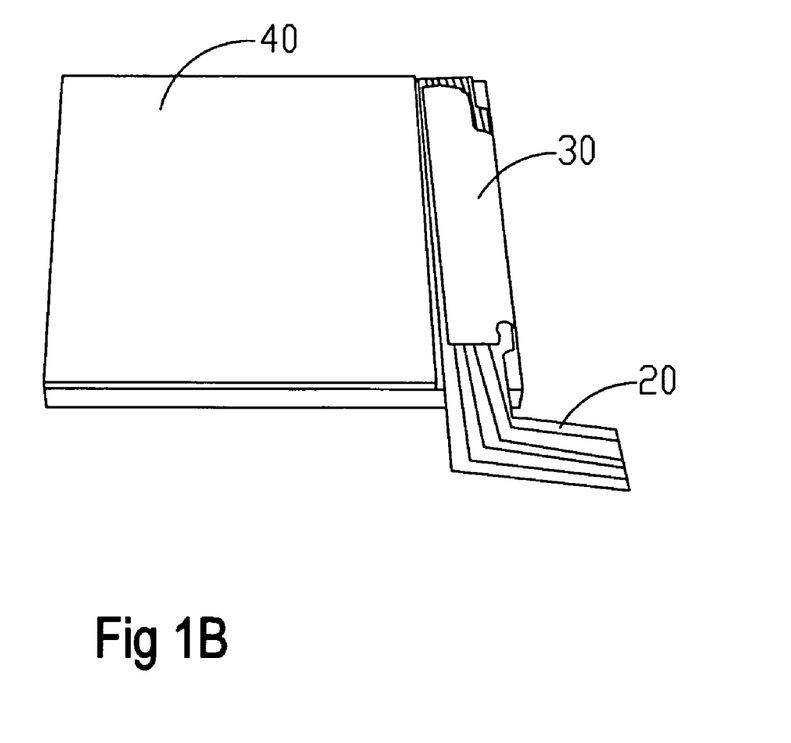
FIG. 1B is a three-dimensional view of another backlight module according to the prior art.

FIG. 1B is a three-dimensional view of another backlight module according to the prior art. As shown in the figure, in order to prevent the backlight module from abnormal operations due to EMI and ESD on the condition that the assembled thickness of the backlight module cannot be increased, a circuit 20 of the backlight module is covered by a sheet of aluminum foil, and a reflector 40 is installed on the backlight module to reflect lights from the backlight module. In addition, the sheet of aluminum foil 30 is connected to the ground such that the ICs, LEDs, or CCFLs of the circuit 20 are protected by the sheet of aluminum foil. By replacing the metal housing 10 with the sheet of aluminum foil 30 and the reflector 40, the problem of thickness increase as a result of installing the metal housing 10 on the backlight module can be avoided.

When a backlight module is subject to EMI or ESD, EMI is prevented by the sheet of foil while ESD is prevented by conducting static charges to the system ground. However, because it is necessary to cover additionally the sheet of aluminum foil 30, the assembly steps will be increased, which means an increase of assembly time, reducing the throughput of manufacturing the backlight module. If the damages caused by EMI and ESD on the backlight module can be avoided while reducing the assembly steps, the throughput of manufacturing the backlight module can be increased.

Accordingly, the present invention provides a reflector that can prevent the backlight module from damages caused by EMI and ESD, as well as reducing assembly steps of the backlight module. Thereby, the throughput of manufacturing the backlight module is increased, solving the problems described above.

SUMMARY

The purpose of the present invention is to provide a reflector, which, by installing an electrical conduction layer in the reflector and connecting the electrical conduction layer to the ground of the system, normal operations of the backlight module can be free from EMI. In addition, by conducting static charges to the ground of the backlight module in terms of the electrical conduction layer, the backlight module can be free from ESD.

The other purpose of the present invention is to provide a reflection of a backlight module, which, by installing an electrical conduction layer in the reflector, the assembly steps of the backlight module can be reduced, and thereby the throughput of manufacturing the backlight can be increased and the manufacturing cost thereof can be reduced as well.

The reflector according the present invention comprises a reflection layer and an electrical conduction layer. The electrical conduction layer is installed in one side of the reflection layer. Thereby, when the present invention is applied in an edge-type backlight module, the edge-type backlight module comprises a light-guide plate, at least one light source, a reflection layer, and an electrical conduction layer. There is a light-entering surface on an edge of the light-guide plate; the light source is disposed on the light-entering surface; the reflection layer is disposed below the light-guide plate; and the electrical conduction layer is disposed below the reflection layer. On the other hand, if the present invention is applied to a direct-type backlight module, the direct-type backlight module comprises a diffuser, at least one light source, a reflection layer, and an electrical conduction layer. The light source is disposed below the diffuser; the reflection layer is disposed below the light source; and the electrical conduction layer is disposed below the reflection layer. By installing the electrical conduction layer in the reflector, the assembly steps of the backlight module can be reduced and thereby the manufacturing cost thereof can be reduced as well. In addition, when connecting the electrical conduction layer to the ground of the backlight module, normal operations of devices in the backlight module can be free from the affects of electromagnetism and static charges.

DETAILED DESCRIPTION

In order to make the structure and characteristics as well as the effectiveness of the present invention to be further understood and recognized, the detailed description of the present invention is provided as follows along with preferred embodiments and accompanying figures.

Figure 2:
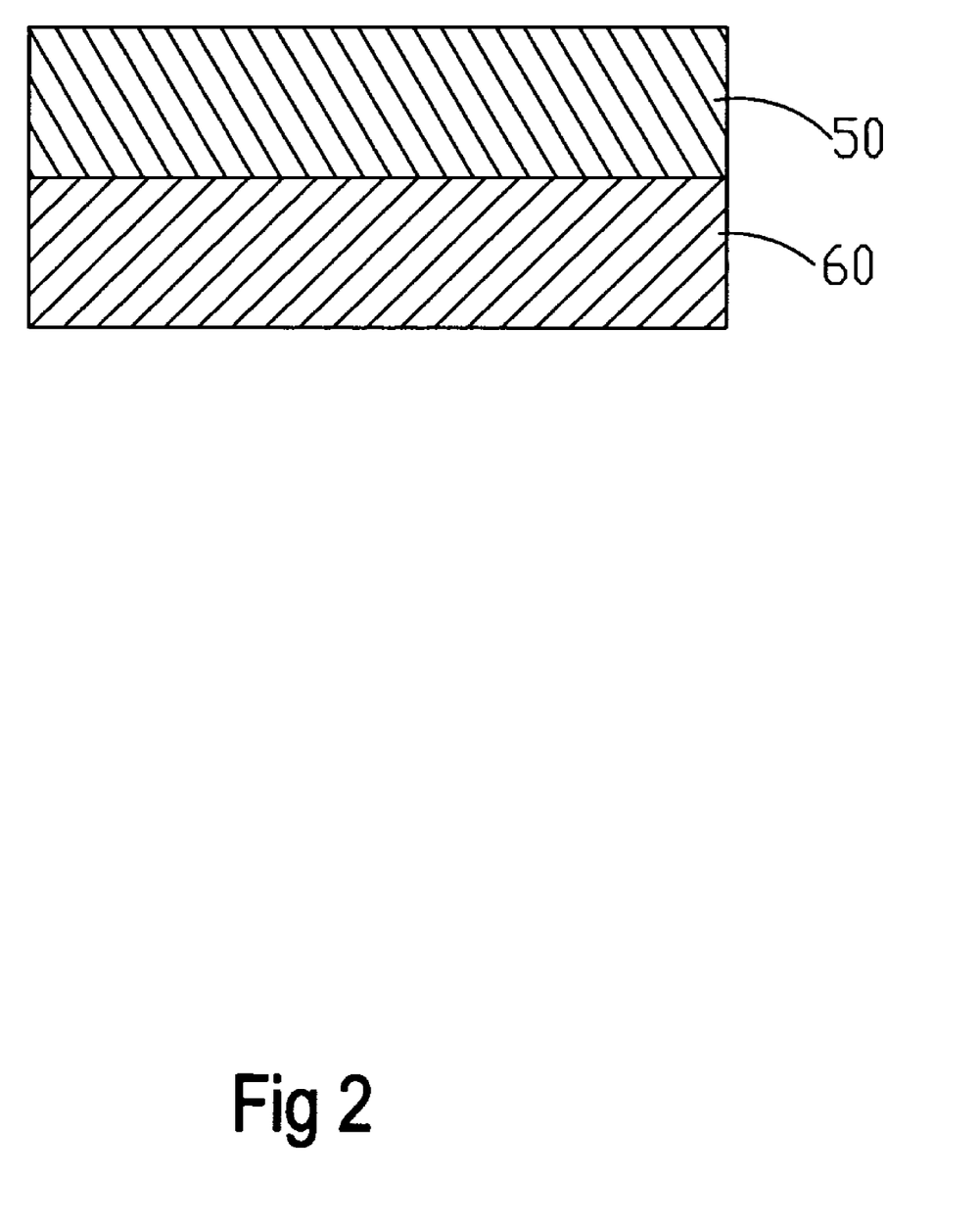
FIG. 2 is a structural schematic according to a preferred embodiment of the present invention.

FIG. 2 is a structural schematic according to a preferred embodiment of the present invention. As shown in the figure, a reflector according to the present invention comprises a reflection layer 50 and an electrical conduction layer 60. The electrical conduction layer 60 is disposed on one side of the reflection layer 50. Thereby, when the reflector of the backlight module according to the present invention is assembled in the backlight module, the electrical conduction layer 60 disposed to face the outer side of the backlight module, and the electrical conduction layer 60 is connected to the ground of the backlight module to prevent the affects of EMI on normal operations of devices in the backlight module. In addition, by conducting static charges to the ground of the backlight module in terms of the electrical conduction layer 60, damages by the static charges on the backlight module can be avoided. Besides, the assembly step of the backlight module can be reduced, and the manufacturing cost thereof can be reduced as well.

The material of the reflection layer 50 includes polyethylene perephthalate or other resins, and the color of the reflection layer 50 is chosen to be white. There are absorption and reflection phenomena on every object while being illuminated by light. If the object is black, most of the light will be absorbed, and only a minority of the light will be reflected. On the contrary, if a white object is illuminated, most of the light will be reflected, and only a minority of the light will be absorbed. Consequently, if polyethylene perephthalate with white color is used to make the reflection layer 50, it will reflect most of the light from a light source of the backlight module, and thus will be suitable for backlight modules without intense luminance. The material of then electrical conduction layer 60 includes aluminum, copper, or other metal materials. The n electrical conduction layer 60 can be disposed below the reflection layer using a pasting method.

Figure 3:
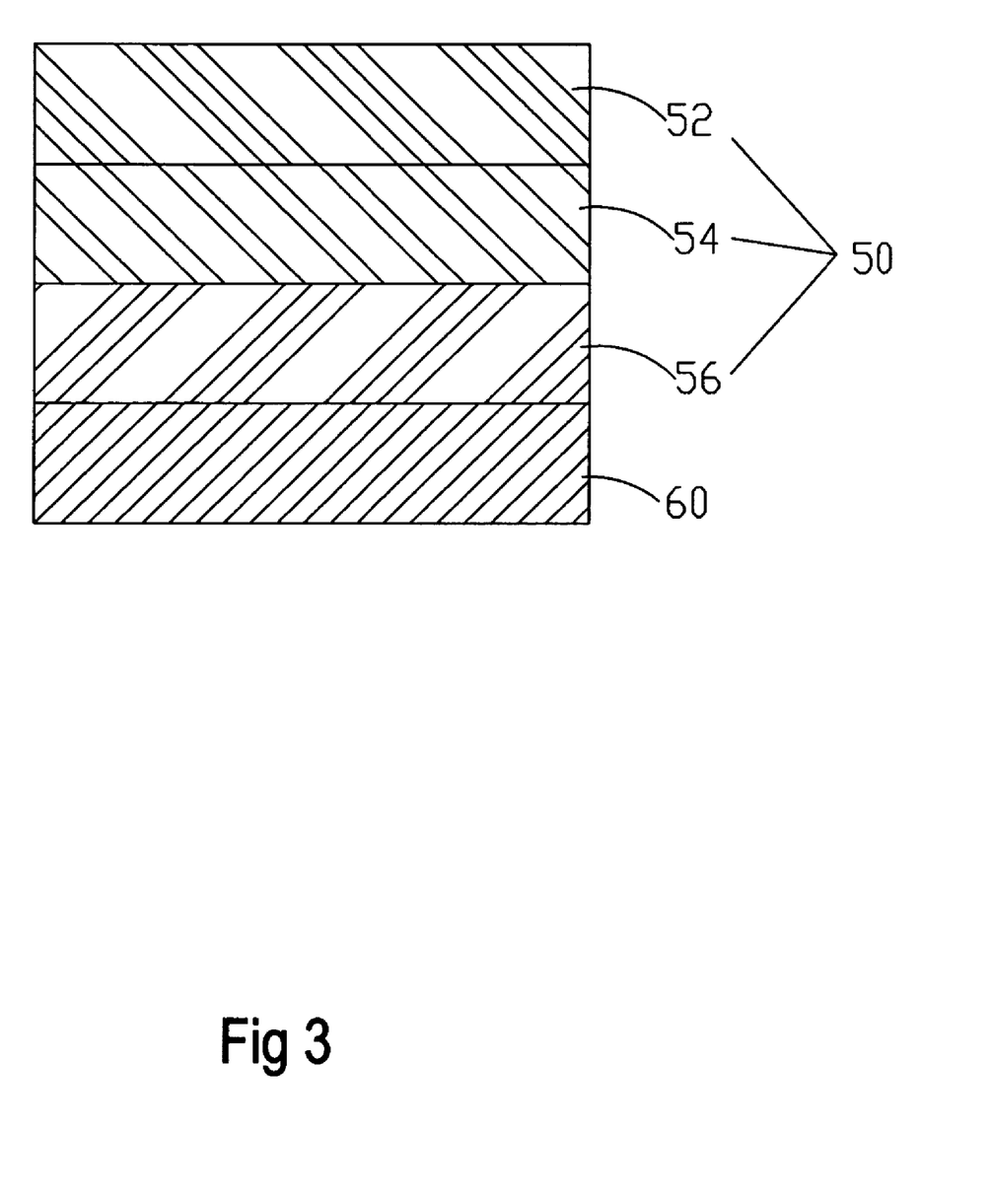
FIG. 3 is a structural schematic according to another preferred embodiment of the present invention.

FIG. 3 is a structural schematic according to another preferred embodiment of the present invention. As shown in the figure, the present embodiment differs from the previous one in that the reflection layer 50 in the present embodiment includes a transparent protection layer 52, a metal layer 54, and a substrate layer 56. The metal layer 54 is disposed below the transparent protection layer 52; the substrate layer 56 is disposed below the metal layer 54. Thereby, the present invention can be applied to backlight modules with intense luminance. Because the thickness of the refection plate is small, the metal layer 54 is pretty thin, and hence it is vulnerable by external forces. In order to protect the metal layer 54 from being damaged and consequently affecting the reflection efficiency of the light, the transparent protection layer 52 and the substrate layer 56 are disposed on and below the metal layer 54, respectively. The material of the transparent protection layer 52 includes polyethylene perephthalate or other resins. In order to make the light from the light source of the backlight module be reflected from the metal layer 54, the transparent protection layer 52 has to be transparent.

The material of the metal layer 54 includes silver or other metals. Among them, silver is better for its superior reflectivity. The materials of the substrate layer 56 include polyethylene perephthalate or other resins. Because the substrate layer 56 is not used for reflecting light, thus the polyethylene perephthalate used for the substrate layer 56 does not have to be transparent.

Figure 4:
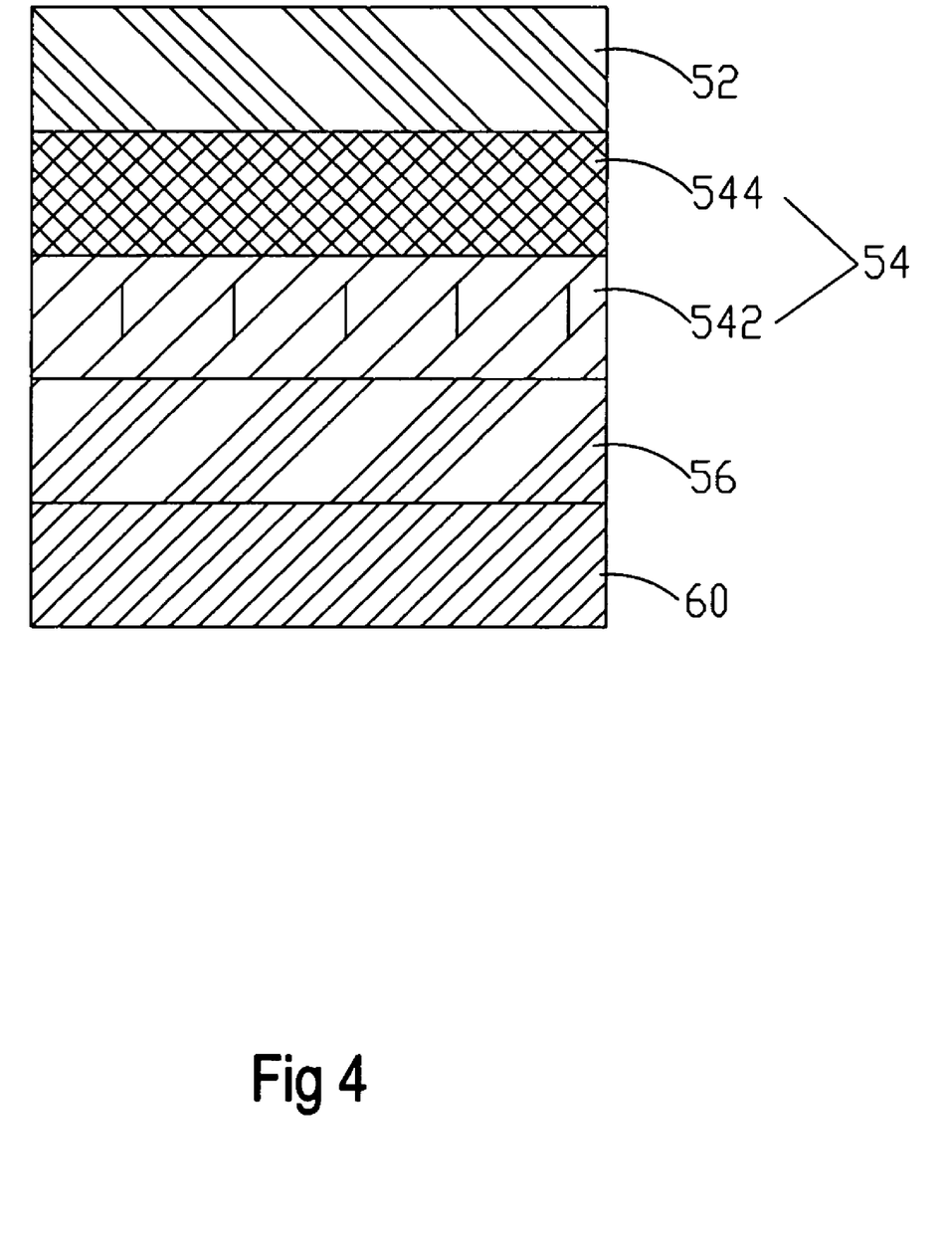
FIG. 4 is a structural schematic according to another preferred embodiment of the present invention.

FIG. 4 is a structural schematic according to another preferred embodiment of the present invention. As shown in the figure, the present embodiment differs from the previous one in that the metal layer 54 in the present embodiment further includes a substrate plate 542 and a silver layer 544, which is formed on the substrate plate 542. In order to make the reflection efficiency of the reflector plate according to the present invention better, silver is used as the metal layer 54. Nevertheless, the cost of silver is higher. Owing to cost concerns, it is necessary to use a small amount of silver to make the metal layer 54. Considering not to affecting the reflection efficiency, vapor deposition method is adopted to form the extremely thin silver layer 544 on the substrate plate 542.

Figure 5:
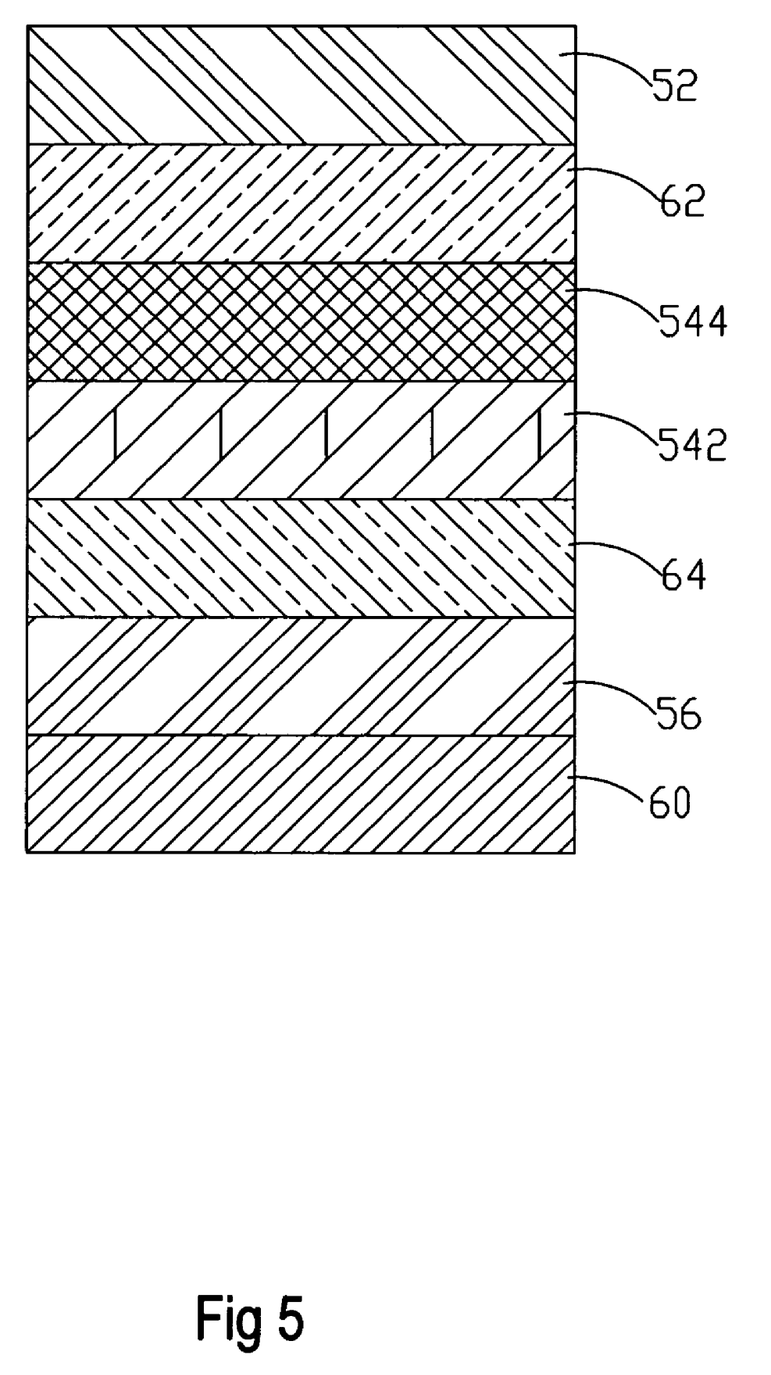
FIG. 5 is a structural schematic according to another preferred embodiment of the present invention.

FIG. 5 is a structural schematic according to another preferred embodiment of the present invention. As shown in the figure, the present embodiment differs from the previous one in that the reflection layer in the present embodiment further includes a first adhesion layer 62 and a second adhesion layer 64. The first adhesion layer 62 is disposed below the transparent protection layer 52, and the second adhesion layer 64 is disposed below the metal layer 54. That is, the second adhesion layer 64 is disposed below the substrate plate 542. The transparent protection layer 52 and the substrate layer 56 are used for protecting the metal layer 54. To avoid peeling of the transparent protection layer 52 and the substrate layer 56 from the metal layer 54 due to long-term usage or other environmental factors of the backlight module, the first adhesion layer 62 and the second adhesion layer 64 are disposed on and below the metal layer 54, respectively, to make the transparent protection layer 52 and the substrate layer 56 adhere more tightly with the metal layer 54, and thus the metal layer 54 is protected.

Figure 6:
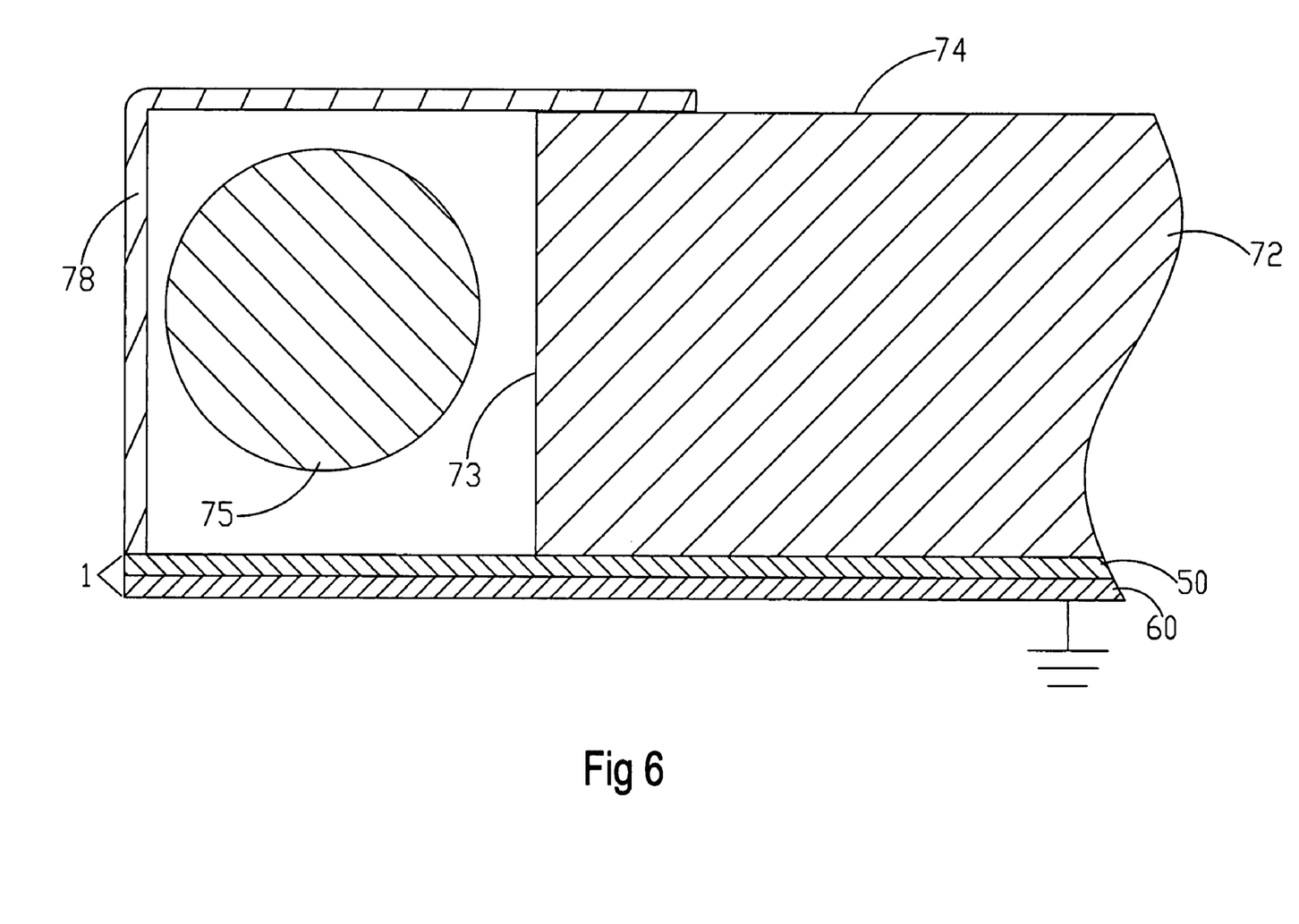
FIG. 6 is a structural schematic of an assembled edge-type backlight module according to the present invention.

FIG. 6 is a structural schematic of an assembled edge-type backlight module according to the present invention. As shown in the figure, when the present invention is applied to an edge-type backlight module, the backlight module includes a light-guide plate 72, at least one light source 75, and a reflector 1. The reflector 1 includes a reflection layer 50 and an electrical conduction layer 60; there is a light-entering surface 73 on an edge of the light-guide plate 72; the light source 75 is installed on the light-entering surface 73; the reflection layer 50 is disposed below the light-guide plate 72; the electrical conduction layer 60 is disposed below the reflection layer 50, and is connected to the ground of the backlight module. Thereby, when the light emitted by the light source 75 enters the light-guide plate 72 via the light-entering surface 73, it will be reflected to a light-exiting surface of the light-guide plate 72 in terms of the reflection layer 50. In order to exploit thoroughly the light emitted by the light source 75, the present embodiment further includes a reflection cover 78 to reflect most of the light to the light-entering surface 73. If the edge-type backlight module is under the influences of EMI or ESD, the electrical conduction layer 60 can conduct excess charges to the ground of the backlight module, thus the light source 75 or other devices of the backlight module can be free from damages.

Figure 7:
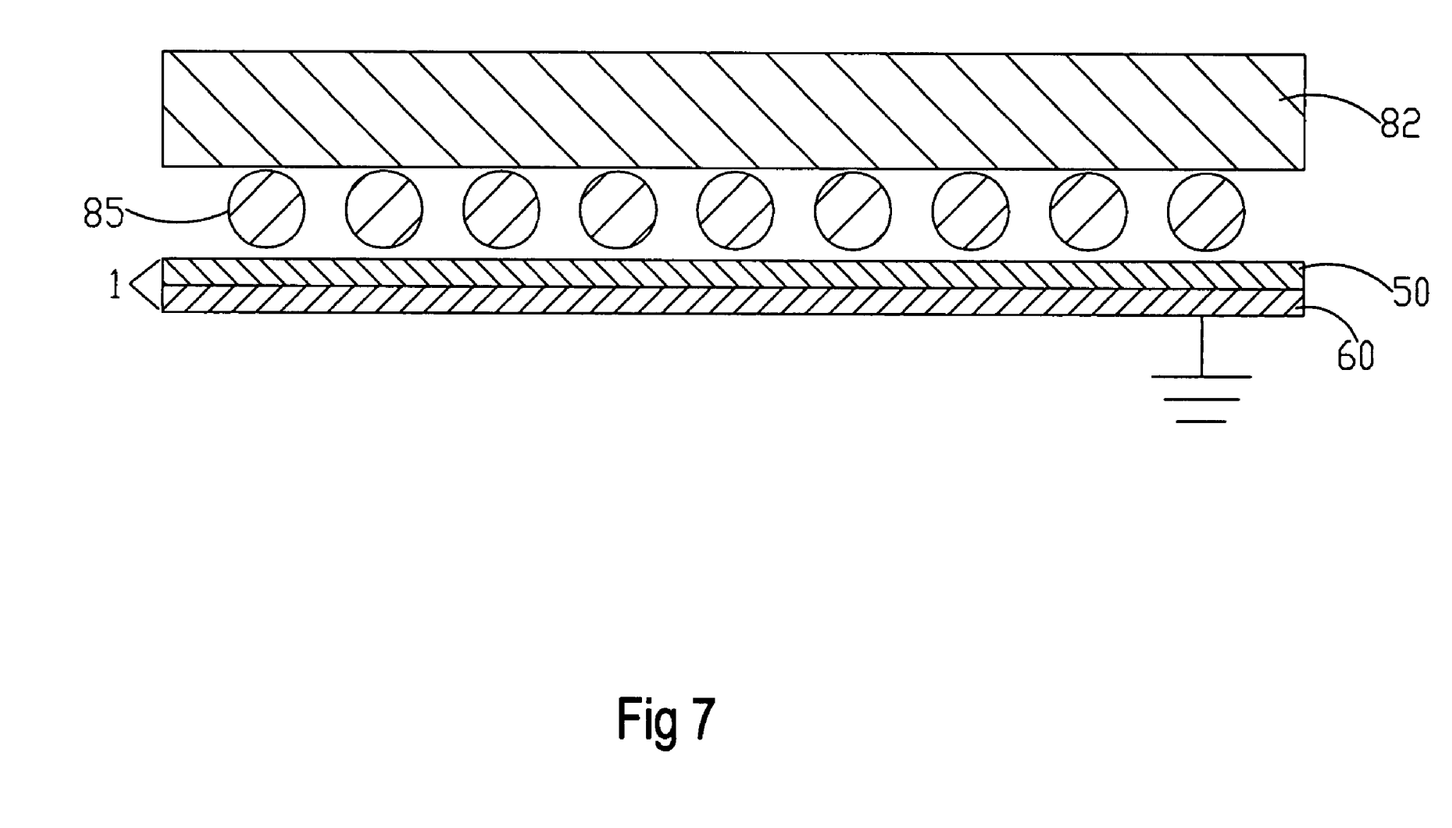
FIG. 7 is a structural schematic of an assembled direct-type backlight module according to the present invention.

FIG. 7 is a structural schematic of an assembled direct-type backlight module according to the present invention. As shown in the figure, when the present invention is applied to a direct-type backlight module, the backlight module includes a diffuser 82, at least one light source 85, and a reflector 1. The reflector 1 includes a reflection layer 50 and an electrical conduction layer 60; the light source 85 is disposed below the diffuser 82; the reflection layer 50 is disposed below the light source 85; the electrical conduction layer 60 is disposed below the reflection layer 50, and is connected to the ground of the backlight module. Thereby, the light emitted by the light source 85 is guided to the light-exiting surface via the light-entering surface 83, and a part of the light emitted by the light source 85 is reflected to the light-entering surface via the reflection layer 50. When the direct-type backlight module is under the influences of EMI or ESD, the electrical conduction layer 60 can conduct excess charges to the ground of the backlight module, thus the light source 85 or other devices of the backlight module can be free from damages.

To sum up, a reflector according the present invention comprises a reflection layer and an electrical conduction layer. The conducting is installed on one side of a reflection layer. The present invention can be applied to an edge-type or a direct-type backlight module. By installing and grounding the electrical conduction layer, normal operations of devices in the backlight module will not be affected by EMI or ESD.

Accordingly, the present invention conforms to the legal requirements owing to its novelty, unobviousness, and utility. However, the foregoing description is only a preferred embodiment of the present invention, not used to limit the scope and range of the present invention. Those equivalent changes or modifications made according to the shape, structure, feature, or spirit described in the claims of the present invention are included in the appended claims of the present invention.

The invention claimed is:

1. A reflection plate for using in a backlight module, comprising a reflection layer and an electrical conduction layer that are laminated together, wherein the reflection layer is a multi-layer comprising a transparent protection layer, a metal layer disposed below the transparent protection layer, and a substrate layer disposed below the metal layer, and the electrical conduction layer directs electrostatic discharges to the ground of the backlight module and is disposed on one side of the reflection layer.

2. The reflection plate of claim 1, wherein the material of the transparent protection layer includes polyethylene terephthalate.

3. The reflection plate of claim 1, wherein the material of the metal layer includes silver.

4. The reflection plate of claim 1, wherein the metal layer comprises:
a substrate plate; and
a silver layer disposed on the substrate plate.

5. The reflection plate of claim 1, wherein the material of the substrate layer includes polyethylene terephthalate.

6. The reflection plate of claim 1, wherein the reflection layer further comprises:
a first adhesion layer disposed below the transparent protection layer; and
a second adhesion layer disposed below the metal layer.

7. The reflection plate of claim 1, wherein the material of the electrical conduction layer includes aluminum.

8. The reflection plate of claim 1, wherein the material of the electrical conduction layer includes copper.

9. An edge-type backlight module, comprising:
a light-guide plate having a light-entering surface on an edge thereof;
at least one light source disposed on the light-entering surface; and
a reflection plate disposed below the light-guide plate, disposed in a direction perpendicular to the path of light from the light source to the light-guide plate; wherein the reflection plate includes a reflection layer and an electrical conduction layer that are laminated together, the reflection layer disposed on the electrical conduction layer; said reflection layer further comprising a transparent protection layer, a metal layer disposed below the transparent protection layer, and a substrate layer disposed below the metal layer.

10. A direct-type backlight module, comprising:
a diffuser;
at least one light source disposed below the diffuser; and
a reflection plate disposed below the light source, disposed in a direction parallel to the path of light from the light source to the diffuser; wherein the reflection plate includes a reflection layer and a electrical conduction layer that are laminated together, the reflection layer adapted to reduce electromagnetic interference and the electrical conduction layer for directing electrostatic discharges to the ground of the backlight module; the reflection layer disposed on the electrical conduction layer; said reflection layer further comprising a transparent protection layer, a metal layer disposed below the transparent protection layer, and a substrate layer disposed below the metal layer.

* * * * *